United States Patent [19]

Yamamoto

[11] Patent Number: 4,675,704
[45] Date of Patent: Jun. 23, 1987

[54] METHOD AND APPARATUS FOR REPRODUCING COLOR IMAGE

[75] Inventor: Naofumi Yamamoto, Tokyo, Japan

[73] Assignee: Kabushiki Kaisha Toshiba, Japan

[21] Appl. No.: 912,643

[22] Filed: Sep. 29, 1986

Related U.S. Application Data

[63] Continuation of Ser. No. 671,241, Nov. 14, 1984.

[30] Foreign Application Priority Data

Nov. 14, 1983 [JP] Japan .............................. 58-213509

[51] Int. Cl.$^4$ ................................................ G03F 3/08
[52] U.S. Cl. .................................... 346/160; 358/282
[58] Field of Search ....................... 346/160, 154, 1.1; 358/80, 282; 364/526, 518, 514; 355/338

[56] References Cited

U.S. PATENT DOCUMENTS 4,535,413 8/1985 Shiota et al. ...................... 358/80

OTHER PUBLICATIONS

Principles of Color Reproduction—pp. 255/281; John A. C. Yule; John Wiley & Sons, Inc., (1967).
The Journal of the Institute of Television Engineers of Japan 37,7; p. 551—Tone and Color Reproduction Method for Hard-Copy Printer; Hiroaki Kotera; 1983.

Primary Examiner—Arthur G. Evans
Attorney, Agent, or Firm—Banner, Birch, McKie & Beckett

[57] ABSTRACT

A color image output device scans an original image and reproduces the image on a color printer. The device includes an input unit which derives a plurality of color signals corresponding to each picture element of the original image. The color signals are converted into a set of luminance and subtracted color signals. The set of luminance and subtracted color signals are then converted into a set of ink concentration signals for the color printer using a conversion table.

The conversion table stores sets of ink concentration signals which are within a reproducible range of colors by the color printer. Where the set of luminance and subtracted color signals do not correspond to a reproducible color by the printer, an alternate set of reproducible ink concentration signals are provided by the conversion table.

5 Claims, 12 Drawing Figures

METHOD AND APPARATUS FOR REPRODUCING COLOR IMAGE

This application is a continuation of application Ser. No. 671,241, filed Nov. 14, 1984.

BACKGROUND OF THE INVENTION

The present invention relates to the field of color image reproduction and, more particularly, is directed to a method and apparatus which greatly improves the quality of a reproduced color image.

Advancements in color image technology in recent years has been accompanied by considerable research and development directed to practical applications of color photocopiers and printers. There are two types of color photocopiers presently known in the art. In one type, color reproduction is accomplished by photoelectric conversion of the original color image to electronic signals which are processed and used to form the reproduced color image. This method, however, is deficient because of poor resolution of the reproduced image and lack of quality due to the generation of noise components during the photoelectric conversion process. In another type of photocopier known in the art, the color image is formed by chemical processing in the same manner as in conventional photocopiers. Though the electronic conversion method of color image reproduction has the above mentioned deficiencies, it has received a great deal of attention because it does not require the cumbersome handling of chemicals and can be used to process images in a variety of ways.

In a conventional color image reproduction system where the original image is electronically processed, the original image is electronically scanned through color filters to provide three color signals. These analog signals are then converted to digital signals by an analog to digital convertor (A/D convertor). The digital signals are then subjected to separation and conversion of a luminance signal and two subtracted color signals. The luminance and subtracted color signals are then converted to output signals by a ROM based conversion table for application to a reproduction device such as a photocopier or printer.

The conversion table converts the luminance and subtracted color signals to ink concentration signals which match the characteristics of the inks used by the particular photocopier or printer. Processing the scanned image signals by an A/D convertor and performance of the other processing steps, such as shading correction, gamma adjustment and separation into luminance and subtracted signals, can be done by comparatively simple circuitry. However, the conversion of the luminance and subtracted color signals to the requisite ink concentrations is generally a very complex operation. Thus, a look-up table is usually used for the conversion. Mathematical calculations are used to develop the conversion table so that specific combinations of ink concentrations for reproducing colors can be determined for the particular sets of luminance and subtracted color signals. Such mathematical calculations are disclosed by John A. C. Yule in a publication entitled "Principle of Color Reproduction," 1967, pp. 255-281. In actual practice, however, not all the specific sets of luminance and subtracted color signals can be converted to corresponding ink concentrations which can be reproduced by the reproduction device. Thus, no information is reproduced for these signals. In practice, there is a strong likelihood that luminance and subtracted color signals which have no corresponding ink concentrations will be produced due to the generation of random noise components in the system. Thus, the quality of the reproduced image will be greatly deteriorated.

SUMMARY OF THE INVENTION

It is the overall object of the present invention to provide an improved method and apparatus which greatly improves the quality of a reproduced color image.

It is a specific object of the present invention to provide an improved method and apparatus for reproducing a color image which is relatively immune to noise interference.

It is a further specific object of the present invention to provide an improved method and apparatus for reproducing a color image wherein ink concentration color signals that are reproducible are assigned to luminance and subtracted color signals not normally reproducible in a reproduced image.

It is another specific object of the present invention to provide an improved method and apparatus for reproducing a color image which is simple and reliable in operation.

It is a still further specific object of the present invention to provide an improved method and apparatus for reproducing a color image which results in a high quality reproduced image while at the same time being easy to implement.

In the present invention, an ink concentration conversion table is provided in which output signal values are assigned corresponding to all possible sets of luminance and subtracted color signals that may be supplied as representing an original color image, including sets which would not normally result in a reproducible output. The conversion table of the invention automatically assigns ink concentrations values for those sets of luminance and subtracted color signals which correspond to colors that are producible as output by the output device. For those sets of luminance and subtracted color signals which do not correspond to colors that are normally reproducible by the output device, the conversion table assigns the nearest ink concentration values that are reproducible.

According to the invention, when noise is present in the system which would result in the production of sets of luminance and subtracted color signals to which there are in principle no corresponding colors producible as output, the conversion table outputs signal values that are producible as output which correspond as closely as possible to the colors corresponding to the luminance and subtracted color signal sets in question. Thus, it is possible for a more complete image to be produced by the output device. Accordingly, good quality color image reproduction is achieved regardless of the presence of noise in the system.

DETAILED DESCRIPTION OF THE PREFERRED EMBODIMENT

Figure 1:
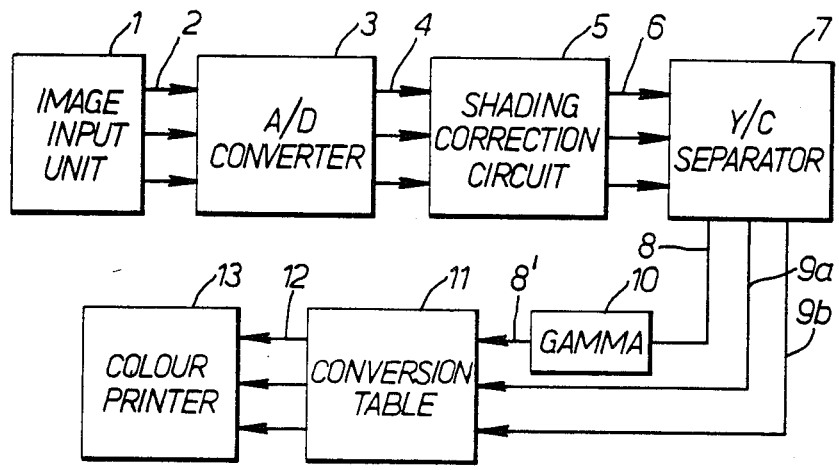
FIG. 1 is a block diagram of a color image output device in accordance with one embodiment of the present invention.
Figure 2:
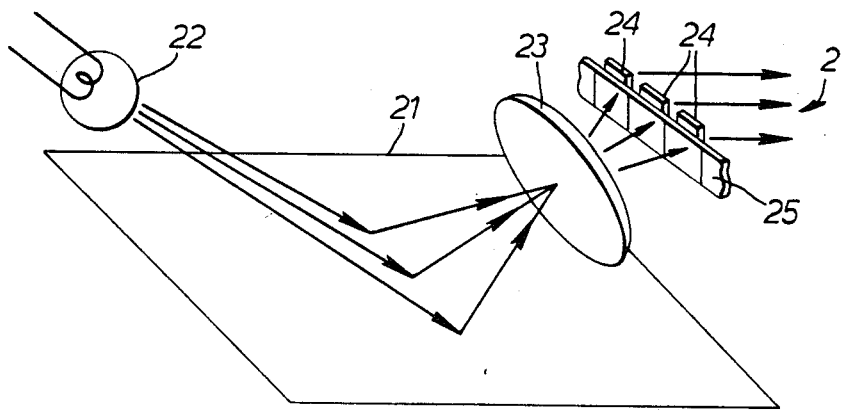
FIG. 2 is a more detailed diagram of the image input unit shown in FIG. 1.

One embodiment of the present invention will now be described with reference to FIGS. 1 and 2. As shown in FIG. 1, image input unit 1 provides original image information as a plurality of color signals 2 and may, for example, be constructed in the manner shown in FIG. 2. As shown in FIG. 2, document surface 21 constituting an object to be copied is illuminated by white light source 22. The image of document surface 21 is focused on the light receiving surfaces of photodetector arrays 24 by lens 23. Filters 25 of three different colors with different spectral transmission characteristics are disposed in corresponding relationship with a succession of three photodetector arrays 24. A set of three successive photodetector arrays 24, with their respective color filters, constitute one picture element. The photoelectric analog outputs of these arrays are produced as color signals 2 shown in FIG. 1 which holds color information for particular picture elements. Color signals 2 are digitalized by A/D converter 3 and the resulting digitized color signals 4 are normalized by shading correction circuit 5 to provide color signals 6. Shading correction circuit 5 includes a table of data on the sensitivity and offset correction for each photodetector array 24 and uses this information to normalize each array 24 with respect to each other array 24. Thus, the effective output of each array is the same value for the same input picture element. Normalized color signals 6 are separated into one luminance signal 8 and two subtracted color signals 9a and 9b by luminance and subtracted color signal separation circuit (Y/C separation circuit) 7. Designating normalized color signals 6 supplied to separation circuit 7 as x1, x2 and x3 and output signal 8, 9a and 9b from separating circuit 7 as y1, y2 and y3, separation circuit 7 performs the matrix operation indicated by the following equation.

$$\begin{pmatrix} y1 \\ y2 \\ y3 \end{pmatrix} = \begin{pmatrix} 1 & 1 & 1 \\ 1 & -1 & 0 \\ 0 & 1 & -1 \end{pmatrix} \begin{pmatrix} x1 \\ x2 \\ x3 \end{pmatrix}$$

Output luminance signal 8 of separation circuit 7 represents the brightness of a picture element and subtracted color signals 9a and 9b represent the hue of the picture element. If the input picture element is achromatic, both subtracted color signals 9a (y2) and 9b (y3) and 0.

Figure 3:
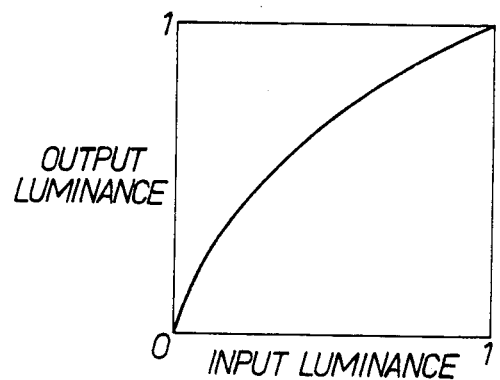
FIG. 3 is a characteristic curve showing the relationship between input and output signals of a gamma adjustment unit shown in FIG. 1.

Luminance signal 8 is further subjected to non-linear conversion by gamma adjustment circuit 10 whose input/output characteristics are shown in FIG. 3. As is well-known, gamma adjustment of the luminance signal is done in order to match the signal to the human characteristics which enable a person to discern levels of darkness. The range of subtracted color signals 9a and 9b produced as outputs from separation circuit 7 and luminance signal 8' obtained from gamma adjustment circuit 10 is close to the color tone discriminability characteristic of humans.

Luminance signal 8' and subtracted color signals 9a and 9b are converted to output signals for application to a reproduction device, e.g., color printer 13, by conversion table 11. Color printer 13 controls the concentrations of inks of different colors in accordance with ink concentration signals 12 from conversion table 11 and prints the color image. Conversion table 11 is included within a ROM for producing outputs of ink concentrations dependent on the level of the luminance and subtracted color signals that are supplied to it.

The data in conversion table 11 is generated as follows. Sets of concentrations of the inks of three colors used by color printer 13 are first specified. Correct color reproduction is made possible by using the set of original ink concentrations as the conversion values (output signals values) provided by conversion table 11 in response to a set of luminance and subtracted color signals.

Figure 4:
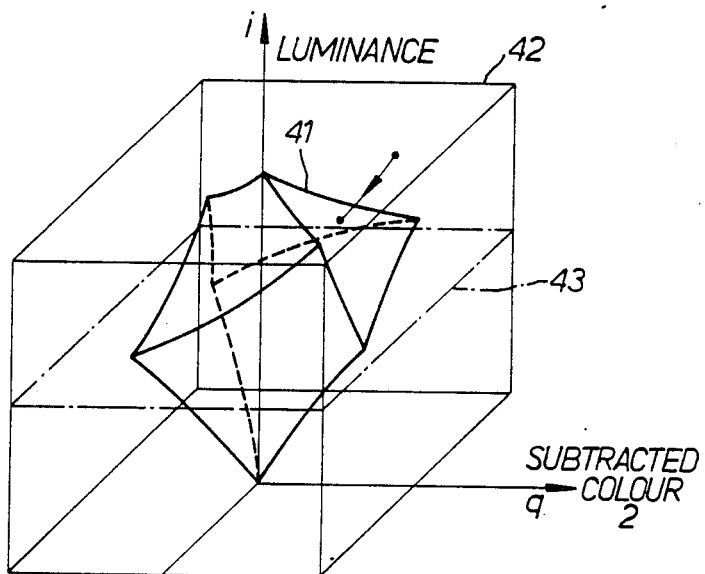
FIG. 4 is a graphical illustration of a multi-faced structure illustrating the color space of a luminance and two subtracted color signals.

As shown in FIG. 4, the sets of luminance and subtracted color signals corresponding to all possible ink concentration sets with which output is possible does not fill the whole of the available luminance and subtracted color space. In FIG. 4, i represents the luminance signal axis, y and q represent the two subtracted color signal axises, curved structure 41 represents the region of luminance and subtracted color signal sets which correspond to sets of ink concentrations producible as output and outer curved structure 42 represents the available luminance and subtracted color signal domain (total luminance and subtracted color space). Thus, in the region outside curved structure 41 in FIG. 4, the luminance and subtracted color signal sets do not fall within the ink concentrations which are reproducible as output by the printer.

In the invention, however, conversion to ink concentration signals which are reproducible as output by the printer is achieved even for those sets of luminance and subtracted color signals that do not normally correspond to colors producible as output. An example of this will be described with reference to FIG. 5.

Figure 5:
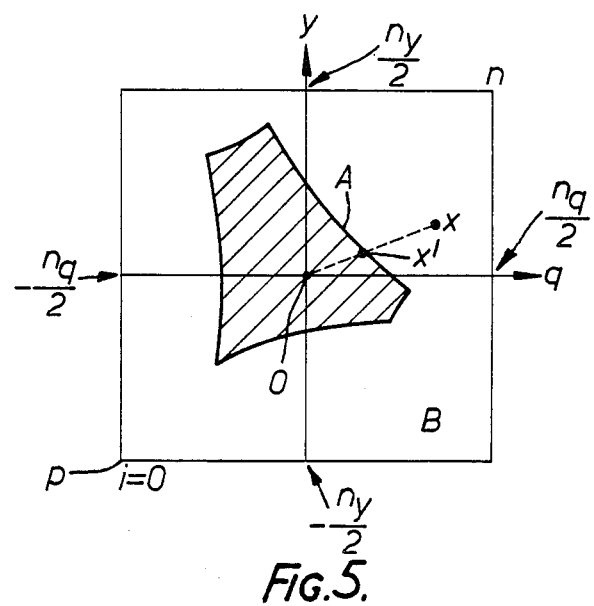
FIG. 5 is a cross-sectional view of the multi-faced structure of FIG. 4.

FIG. 5 is a cross-section of the luminance surface indicated by dotted line 43 in FIG. 4. Shaded portion A is a cross-section of curved structure 41 indicating the region in which values for conversion to ink concentration signals determined by the above-noted calculation (defined conversion values region). The conversion values for a signal at a point X in unshaded portion B (undefined conversion values region) falls outside the defined conversion values region. In accordance with the present invention, however, the conversion values for point X are assigned the conversion values for a point X'. Point X' is located at a point which intersects the boundary with the defined conversion values region A on a line drawn between origin C and point X. Performing this operation for the whole of the undefined conversion values in region B and processing in a similar manner for all equal luminance planes makes it possible to provide conversion data for all sets of luminance and subtracted color signals so that a color image may be fully reproduced.

Figure 6:
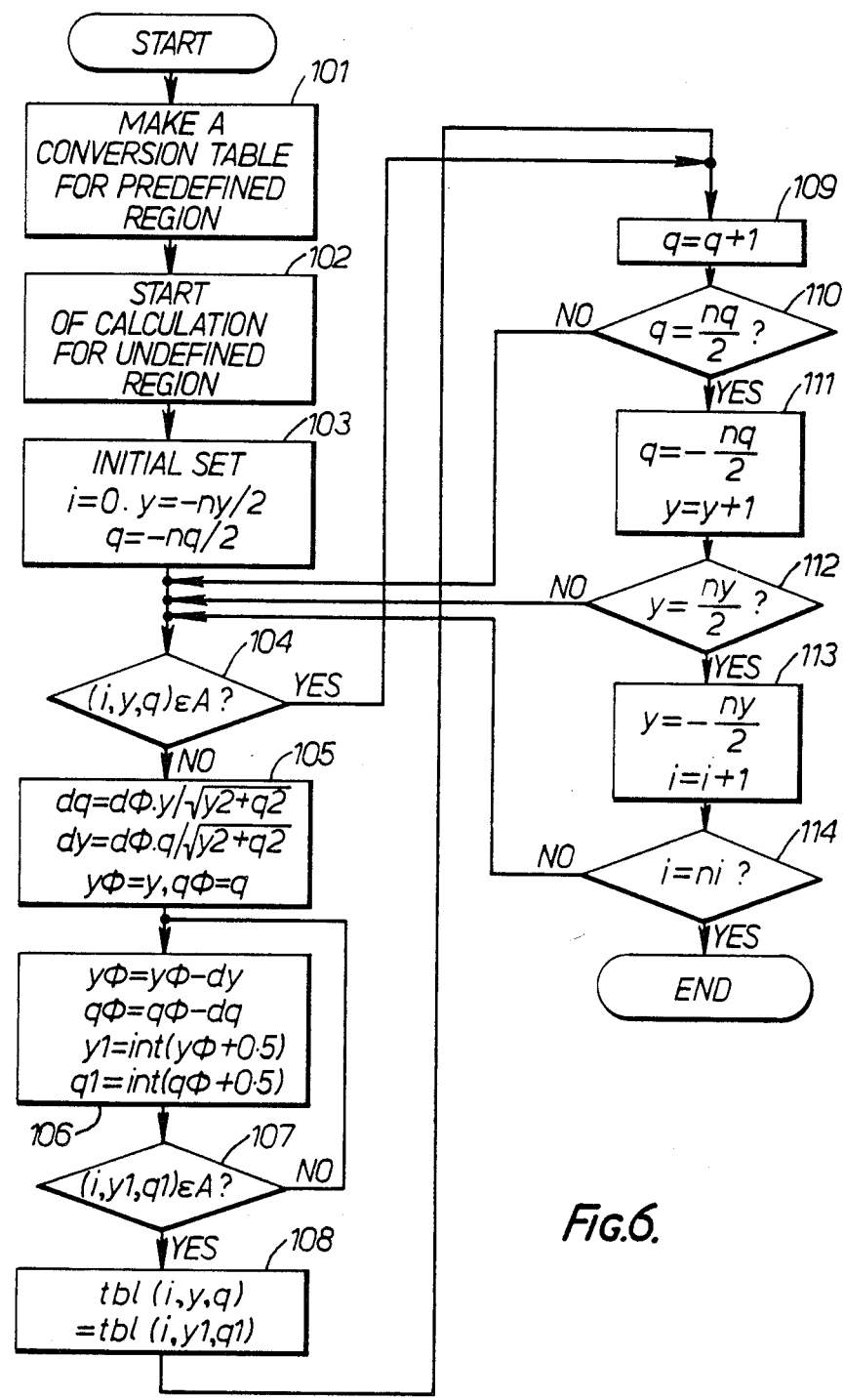
FIG. 6 is a flow chart for determining conversion table values in accordance with the present invention.

An example of an algorithm for filling the undefined conversion values for region B in conversion table 11 will now be described with reference to the flow chart shown in FIG. 6. In step 101, the conversion values for the defined region A shown in FIG. 5 are determined by calculations using theoretical formulae, for example, using a Negebauer equation or by a masking equation. These values are then entered in the conversion table. In step 102, the calculation is begun for determining the conversion values for undefined region B shown in FIG. 4. In step 103, parameters i, y and q are initialized. In step 104, a determination is made whether point (i, y, q) lies within the defined conversion values region A. If it does not, it is assigned the conversion values for point X. Point X is located at a point which intersects the boundary with the defined conversion values region A on a line drawn between the origin (i, 0, 0) and point (i, y, q). For this purpose, point (i, q, y) is shifted very small amounts towards the point or origin O, as indicated by steps 105 and 106. The vector representing this movement is $d\phi$, and its q component dq is given by $$d\phi \cdot y / \sqrt{y^2 + q^2}$$

and its y component dy is given by $$d\phi \cdot q / \sqrt{y^2 + q^2}.$$

In this case, the y and q coordinates when y and q have been shifted by the amounts dy and dq, respectively, are represented by $y\phi$ and $q\phi$. Each time a new $y\phi$ and $q\phi$ are set in step 106, a check is made in step 107 to determine if these coordinates (i, y1, q1) are contained in the defined conversion values region A. Since the combinations of coordinates made in this process must use only integer values, coordinates $y\phi$ and $q\phi$ are converted to integers y1 and q1 in step 106. If the results of the determination in step 107 shows that coordinates (i, y1, q1) to which a shift has been made are not contained in region A, there is a return to step 106 and a further shift is made. If the coordinates of the point reached as a result of this shift lie within region A, these coordinates are regarded as being near the boundaries of regions A and B. The conversion values of tbl (i, y1, q1) are determined in step 108, and these values are stored as the conversion values for tbl (i, y, q).

If the determination in step 104 is that point (i, y, q) is contained in region A, there is a move to step 109 and q is incremented by 1 and point (i, y, q) is shifted to the right as shown in FIG. 5. These is then a return to step 104. If it is determined in step 110 that q has reached the upper limit nq/2 as a result of this shift, y is incremented by 1 in step 111 and point (i, y, q) is shifted upward as shown in FIG. 5. There is then a return to step 104. If it is determined in step 112 that y also has reached the upper limit ny/2, i is incremented by 1 and there is a return to step 104. However, if it is determined by step 114 that i also has reached the upper limit ni, the operation for filling in region B is complete.

Constructing conversion table 11 in the above-described manner offers the following advantages. There is a strong correlation among normalized color signals 6 and so the S/N ratio for liminance signal 8, which is the sum of these signals, is higher than for the normalized color signals. On the other hand, the S/N ratio of subtracted color signals 9a and 9b, which represents the difference between the pairs of normalized color signals 6, is lower than that of normalized color signals 6. Therefore, noise added to color signals 2 affects color signals 9a and 9b more than luminance signal 8. When the conversion table of the construction described in this embodiment is used, reproduction of good color images is possible. Also, since human vision has greater discriminating ability with respect to luminance than with respect to hues, if there is input of signals for colors that cannot be represented by the inks used by the color printer, those of the colors representable by these inks that are visually the closest to these unrepresentable colors can be regarded as having the same luminance and being the colors that are the nearest within the relevant equal brightness plane. The conversion table construction described in this embodiment makes it possible to effect output of visually close colors even when there is input of signals for colors that are not producible as output.

Although in the above embodiment, the conversion values (signal values for output) assigned for a particular set of luminance and subtracted color signals that are not producible as output are conversion values which represents sets of luminance and subtracted color signals that are producible as output, it is also possible to have the conversion table so constructed that the conversion values assigned are the conversion values of a point corresponding to a color producible as output in the luminance and subtracted color space in the vicinity of the above-noted closest set of luminance and subtracted color signals.

Figure 7:
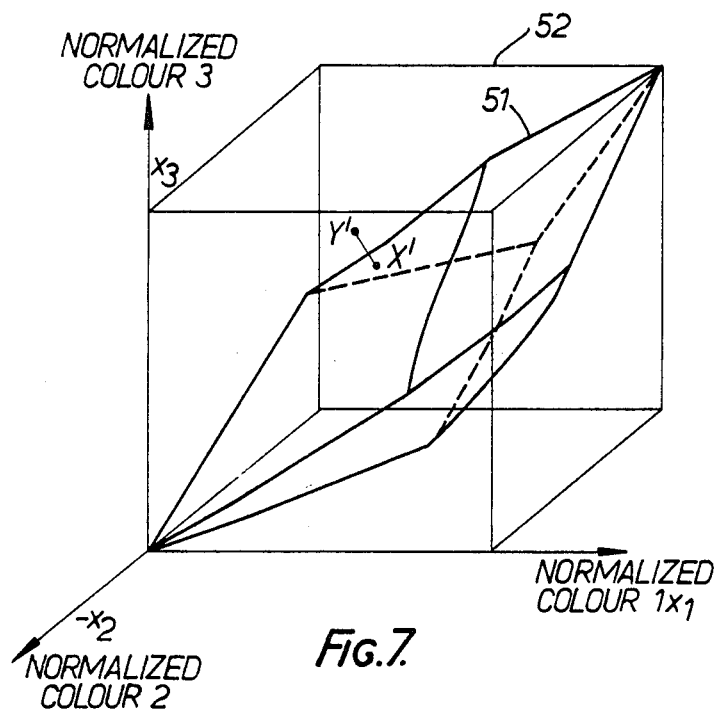
FIG. 7 is a graphical illustration of a multi-faced structure illustrating a normalized color space.

For example, conversion values relating to an outside point Y, shown in FIG. 4 being located outside of curved structure 42, are derived according to the following procedure. First, normalized color values (y1, y2, y3) of a point Y' are derived in normalized color space, point Y' corresponding to point Y. FIG. 7 shows a normalized color space having three axes x1, x2 and x3, each corresponding to one of the normalized color signals curved structure 51 corresponds to curved structure 41 in FIG. 4 but has a slightly deformed appearance becaue normalized color signals are more correlative than luminance and subtracted color signals.

Normalized color values (x1, x2, x3) of a point X' in which an error distance E becomes minimum are calculated. Error distance E is defined as follows:

$$E = \sum_i (x_i - y_i)^2 / V_i$$

where $V_i$ is a variance of noise appearing in each of the normalized color signals.

The conversion values relating to point Y are derived as conversion values of point X in FIG. 4 which corresponds to point X in FIG. 5. The above procedure is repeated for all outside points of the curved structure. Thus, conversion table 11 can produce a highquality image by eliminating the influence of noise imposed on color signals 2. Such noise is considered to have a rather low correlation and Gaussian distribution. The probability P of normalized color signals (x1, x2, x3) within the curved structure becoming normalized color signals (y1, y2, y3) outside the body caused by noise is given by the expression:

$$P\alpha \exp\left(-\sum_i (x_i - y_i)^2/V_i\right)$$

Thus, conversion values for point Y should be represented by the value which becomes the maximum of the probability. This condition is equivalent to finding the minimum of error distance $$E = \sum_i (x_i - y_i)^2/V_i.$$

In the above procedure, variance $V_i$ may be replaced by constants $V_{ij}$ indicating the statistical characteristic of noise depending on the definition of the color signal space being considered. The line defined by $$\sum_{ij} (x_i - y_i)(x_j - y_j)/V_{ij}$$

may be used as error distance E.

Figure 8:
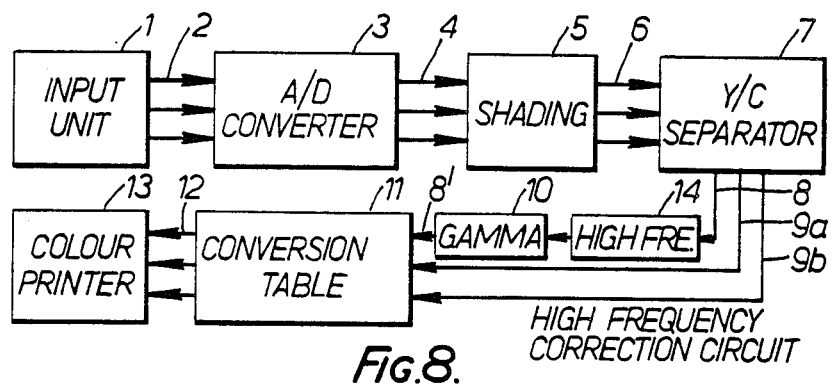
FIG. 8 is a block diagram of a color image output device in accordance with another embodiment of the present invention.
Figure 9:
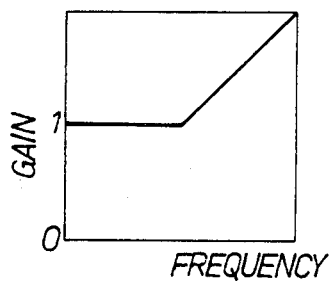
FIG. 9 is a graph of a characteristic curve indicating the relationship between gain and frequency of the high-frequency correction circuit shown in FIG. 8.
Figure 10A:
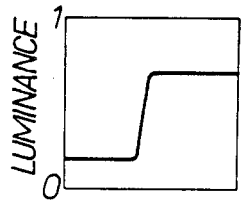
FIG. 10A is a graph of a luminance signal having slow rise time indicating a slow change in luminance.
Figure 10B:
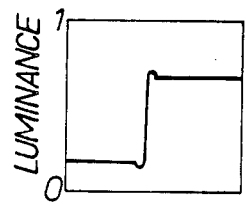
FIG. 10B is graph of a luminance signal having a fast rise time and an overshoot portion indicating a rapid change in luminance.

FIG. 8 shows a block diagram of another embodiment of this invention wherein a high-frequency correction circuit 14 is provided between separator 7 and gamma adjustment circuit 10. According to this embodiment, the high-frequency range of signal 8 is emphasized by high-frequency correction circuit 14 and then gamma adjusted by circuit 10. The high-frequency correction circuit 14 is used in order to correct the decrease high-frequency range of the image signals caused by the optical system of the image input unit. The gain to frequency characteristic of high-frequency correction circuit 14 is shown in FIG. 9. The higher the frequency, the higher the gain of the luminance signal. Thus, such signals having a slow change in luminance as shown in FIG. 10A are corrected to a rapid change in luminance as shown in FIG. 10B. It does, however, generate overshoots near the edge portions as shown in FIG. 10B because of the incomplete correction by circuit 14. This causes sets of luminance and subtracted color signals which do not correspond to colors that are producible as output.

Figure 11:
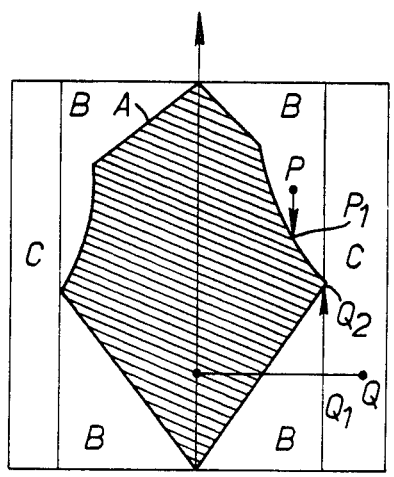
FIG. 11 is a cross-sectional view of the multi-faced structure of FIG. 7.

FIG. 11 shows a cross-sectional view of the curved structure shown in FIG. 4 whose cross-sectional plane includes the luminance axis or achromatic color axis. Slashed region A is a cross-section of curved structure 41 in which conversion values from luminance and subtracted color signals to ink concentration values are given by equations. Unslashed regions B and C are located outside of curved structure 41 but inside of body 42, and is separated by a tangent line which touches the most outer point of the curved structure 41.

Conversion values for points in region B are determined as follows: First, a point P of region B is specified. Then a point P1 which is inside of region A is determined. Point P1 represents the subtracted color signal and should be an equal distance from the luminance axis and be close to the luminance value. The conversion values of point P is determined by the conversion values of point P1. Such an operation is repeated for all the points included in region B.

Conversion values for points in region C are determined as follows. First, a point Q of region C is specified. A point Q1 on the tangent line is then determined. Point Q1 has the same luminance as point Q, i.e., it is the crossing point between the tangent line and a line which passes through point Q and is perpendicular to the luminance axis. Next, a point Q2 which is inside a region A is determined in a similar manner. That is, point Q2 is the most outer point in region A. Thus, the conversion values of point Q is determined by the conversion values of point Q2. Such an operation is repeated for all the points included in region C.

The conversion table can be constructed so that a set of luminance and subtracted color signals that do not correspond to a color producible as output is assigned output signal values that are the same as those assigned to sets of luminance and subtracted color signals that correspond to colors producible as output.

The present invention is not just for production of color images in the form of hard copy in a color photocopier as described by way of example in the above embodiment, but as long as a similar conversion table is employed it may be applied, e.g., to an apparatus for showing color images in a color display, etc.

Obviously, many modifications and variations of the above described preferred embodiment will become apparent to those skilled in the art from a reading of this disclosure. It should be realized that the invention is not limited to the particular apparatus disclosed, but its scope is intended to be governed only by the scope of the appended claims.

I claim:

1. A device for reproducing an original color image from a predetermined range of colors, said device comprising:

input means for providing a plurality of color signals corresponding to each picture element of said original color image;

separating means coupled to said input means for converting the color signals into corresponding luminance and subtracted color signals;

conversion means coupled to said separating means for converting said luminance and subtracted color signals to corresponding reproducing signals, wherein when said luminance and subtracted color signals do not represent a color within said predetermined range of colors, said conversion means converts said luminance and subtracted color signals to reproducing signals which correspond to luminance and subtracted color signals which represent a color within said predetermined range; and reproducing means connected to said conversion means and operable over said predetermined range of colors for reproducing each picture element of said original image in accordance with said reproducing signals.

2. A color image output device according to claim 1 wherein said alternate set of reproducing signals corresponds to the color closest to the color not within said range of colors.

3. A color image output device according to claim 1 wherein said conversion means includes memory means for storing predetermined reproducing signals for luminance and subtracted color signals which correspond to colors within said range of colors.

4. A method for reproducing an original color image from a predetermined range of colors, said method comprising the steps of:

providing a plurality of color signals corresponding to each picture element of said original color image;

converting the color signals to corresponding luminance and subtracted color signals;

converting said luminance and subtracted color signals to corresponding reproducing signals, wherein when said luminance and subtracted color signals do not represent a color within said predetermined range of colors, converting said luminance and subtracted color signals to reproducing signals which correspond to luminance and subtracted color signals which represent a color within said predetermined range; and reproducing each picture element of said original color image in accordance with said set of reproducing signals.

5. A color image output device according to claim 1 wherein said reproducing means is a color printer and said reproducing signals provided by said conversion means are ink concentration signals for said color printer.

* * * * *